Elbridge Webber.
Machine for Sapping Logs for Clapboards.

No. 116377. Patented Jun 27 1871.

Witnesses:
H. Lansing Perine.
F. W. Ritter, Jr.

Inventor:
Elbridge Webber,
by Geo. W. Rothwell,
Attorney.

116,377

UNITED STATES PATENT OFFICE.

ELBRIDGE WEBBER, OF GARDINER, MAINE, ASSIGNOR OF ONE-HALF HIS RIGHT TO GEORGE W. COLBURN, OF SAME PLACE.

IMPROVEMENT IN MACHINES FOR SAPPING LOGS FOR CLAPBOARDS.

Specification forming part of Letters Patent No. 116,377, dated June 27, 1871.

*To all whom it may concern:*

Be it known that I, ELBRIDGE WEBBER, of Gardiner, in the county of Kennebec and State of Maine, have invented a new and useful Improved Machine for Sapping Logs for Clapboards; and I do hereby declare the following to be a full, clear, and exact description thereof, sufficient to enable others skilled in the art to which my invention appertains to fully understand and to make and use the same, reference being had to the accompanying drawing making part of this specification, in which—

Figure 1:
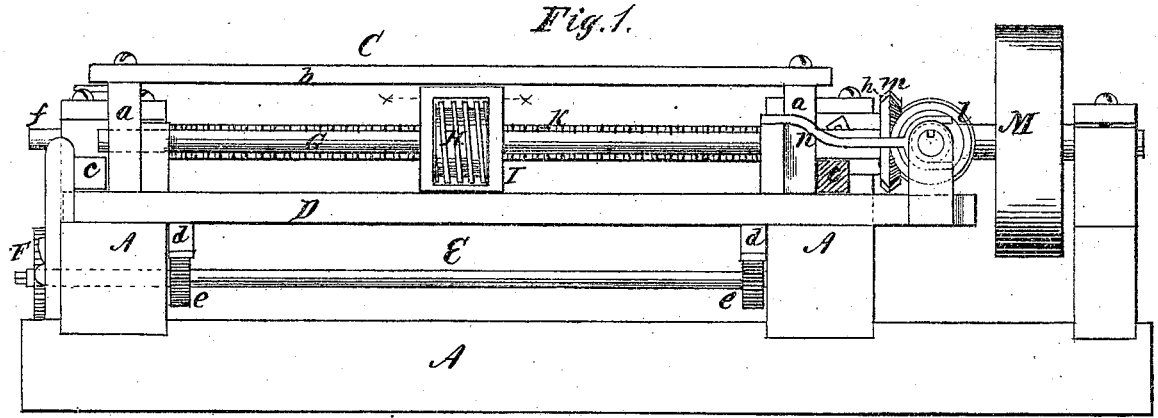
Figure 2:
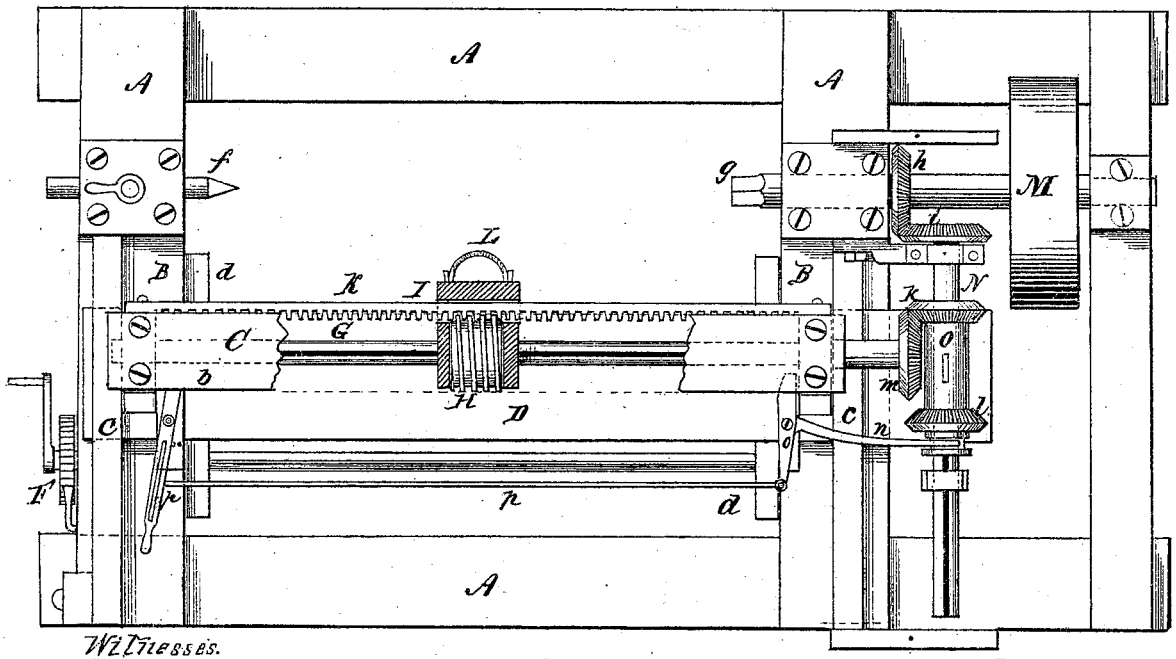

Figure 1 is an elevation of the rear of the machine, and Fig. 2 is a top plan view of the same.

Similar letters of reference indicate corresponding parts in the two figures.

In the manufacture of clapboards the bark is removed from the log and the boards sawed or riven therefrom, sometimes with equal thickness throughout and sometimes tapering in thickness transversely. Boards produced by riving still retain the "sap" portion of the log, as known among lumbermen, being that next to the bark; which portion, after a little exposure, soon decays, and if not removed will ruin the lumber. The object of my invention is to produce a machine that will remove the sap from the log before it is cut into boards, and which will allow of the manufacture of boards of better quality and with greater rapidity; and to this end it consists of a carriage bearing the cutter or knife-block, which is operated by an endless screw or worm and a rack, the carriage being moved on its bed by racks and pinions; also, a reversible gearing, in connection with the driving-wheel or pulley, by means of which the cutter is moved from one end of the carriage to the other. Finally, the arrangement of the several parts, as described, as and for the purpose to be hereinafter specified, the construction being such that, while the cutter-block traverses the carriage from one end of the same to the other, its movement being regulated by a reversible gearing, the log is revolved in the same plane with the cutter and the sap is taken off in spiral lines.

Having stated that the object of my invention was the production of a machine for removing the sap or outer part of logs through which the sap of the tree circulates, I will describe my machine as illustrated in the accompanying drawing.

A may designate a suitable frame-work upon which the mechanism is mounted. B is the bed upon which the carriage moves. C is the carriage, composed of a bed, D, which rests on the bed B, and is secured between guides *c c*; also of standards *a a*, and a cross-piece, *b*, secured on top of the standards. Two toothed racks, *d d*, are secured underneath the bed D, and their teeth mesh with pinions *e e* on a shaft, E, which has its bearings in the frame A, and projects through it at one end and bears a crank-handle and a ratchet, F, with which a pawl engages. The crank-handle serves to operate the pinions, which, engaging with the racks *d*, the carriage is thereby moved back and forth on its bed, as desired. The racks *d d* are so arranged relatively to the bed B as that they form guides to further regulate the movement of the carriage C. K is a toothed rack secured to the standards *a a*. G is a shaft extending through the carriage and having its bearings in the standards *a a*. L is a semicircular or other cutter suitably secured in a block, I, which is arranged on the rack K and shaft G, between the bed D and cross-piece *b*, the latter serving as guides for it when it is made to traverse the length of the carriage. A worm, H, is secured on the shaft G, loosely, by a lug, which is so arranged as to fit into a groove made lengthwise in the shaft. The block I is recessed to receive this worm, and it is placed in such position relatively to the rack as that it will engage with the teeth of the rack, and when the shaft is rotated the block will be carried from one end of the carriage to the other. M is a pulley or driving-wheel, the shaft of which is squared at *g* to enter a corresponding recess previously made in one end of the log to be sapped, which is secured thereto by iron dogs. The other end is held by an adjustable center, *f*, which is driven into the log far enough to sustain it while it revolves, and is then held in place by a yoke which embraces the center inside of the box, and, extending up through the box, has a thread cut upon it which receives a nut to regulate its adjustment relative to the center *f*. The gearing for transmitting the power from the driving-wheel consists of a beveled wheel, *h*, on the driving-wheel shaft, which meshes with a like wheel on the end of a shaft, N, hung in suitable bearings. The motion thus given to shaft N is communicated to a sleeve, O, adjustably secured on said shaft by means of a lug projecting therefrom into a groove in the shaft, and this sleeve has two beveled wheels, k l, so made as to turn the shaft G in opposite directions, as follows: When it is desired to move the cutter-block toward the lower end of the carriage the wheel k is thrown in gear with a larger beveled wheel, m, on the end of shaft G; and when it is desired to bring it back to the starting point the wheel l is made to mesh with the wheel m. This change is effected by means of the forked lever n, the forked end of which fits in a groove made in one end of the sleeve. This lever is attached to a short arm, o, pivoted to the carriage C. A rod, p, extends from one end of this arm to connect it with an operating lever, r, pivoted to the carriage C, and provided with a spring-catch to hold the sleeve in the desired position, the catch engaging with suitable notches on the carriage. The gearing is protected by a cover, which fits snugly over it and excludes dust, &c.

The operation is as follows: The log to be sapped, after having the bark removed, is secured in the holder—that is, between the parts f and g—in the manner described, and the carriage is then moved toward the log until the knife is sufficiently near to take off the required thickness, being held there by the pawl and ratchet F. Motion is then given to the pulley or driving-wheel, and is communicated, as described, to the shaft G, which moves along the center block, the knife taking off a spiral shaving from the log, which is made to revolve by its being attached to the driving-wheel shaft. Without stopping the machinery the gearing is changed or reversed, and the cutter made to traverse the carriage in the opposite direction, and another shaving of the sap is taken off, and so on until all of it is removed.

Having thus described my invention, what I claim as new, and desire to secure by Letters Patent, is—

1. The carriage C, constructed as described, in combination with the knife or cutter L and block I, the worm and its grooved shaft, and the rack K, when operating together, substantially as described.

2. The shaft G and levers n o p r, in combination with the pulley M, and their connecting-shafts and gearing, substantially as shown and described.

3. The arrangement of the carriage C and its operating mechanism, the cutter-block and cutter, the shaft, worm, and rack, the reversible gearing and the log-holder, substantially in the manner and for the purpose specified.

In testimony that I claim the above I have hereunto subscribed my name before two witnesses.

ELBRIDGE WEBBER.

Witnesses:
R. M. MANSUR,
E. A. MANSUR.